US012615547B2

(12) United States Patent
Henry et al.

(10) Patent No.: US 12,615,547 B2
(45) Date of Patent: Apr. 28, 2026

(54) DUPLICATE DETECTION METHOD FOR MULTI-LINK OPERATION TRANSMISSIONS

(71) Applicant: Cisco Technology, Inc., San Jose, CA (US)

(72) Inventors: Jerome Henry, Pittsboro, NC (US); Vinay Saini, Karnatka (IN); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 417 days.

(21) Appl. No.: 18/467,011

(22) Filed: Sep. 14, 2023

(65) Prior Publication Data

US 2024/0381173 A1 Nov. 14, 2024

(30) Foreign Application Priority Data

May 12, 2023 (IN) .............................. 202341033609

(51) Int. Cl.
*H04W 28/06* (2009.01)
*H04L 1/1607* (2023.01)

(52) U.S. Cl.
CPC ........... *H04W 28/06* (2013.01); *H04L 1/1607* (2013.01)

(58) Field of Classification Search
CPC ......... H04L 1/1607; H04L 1/08; H04W 28/06
See application file for complete search history.

(56) References Cited

U.S. PATENT DOCUMENTS

| | | | |
|---|---|---|---|
| 12,476,662 B2 * | 11/2025 | Asterjadhi | ........... H04B 1/3805 |
| 2021/0120552 A1 | 4/2021 | Fang et al. | |
| 2021/0274489 A1 | 9/2021 | Fang et al. | |
| 2022/0022127 A1 | 1/2022 | Chu et al. | |
| 2022/0248489 A1 * | 8/2022 | Kwon | ................... H04W 76/00 |
| 2023/0008481 A1 * | 1/2023 | Ina | ................... H04W 74/0866 |
| 2023/0021262 A1 | 1/2023 | Huang et al. | |
| 2023/0083654 A1 | 3/2023 | Jang et al. | |

(Continued)

FOREIGN PATENT DOCUMENTS

WO 2023280978 A2 1/2023

OTHER PUBLICATIONS

Cena G., et al., "Seamless Redundancy for High Reliability Wi-Fi", arXiv:2306.10793v1 [cs.NI], Jun. 19, 2023, 4 Pages.

(Continued)

*Primary Examiner* — Syed Ali
(74) *Attorney, Agent, or Firm* — Polsinelli P.C.

(57) ABSTRACT

In one aspect, a method includes associating an MLO device with 2 transmission radios to yield a first communication link between the device and a first MLO access point and a second communication link between the device and a second MLO access point, wherein the device is configured to label the first communication link as a primary link and the second communication link as a secondary link; generating a sequence number to be assigned to a frame to be transmitted on the primary link and to a duplicate copy of the frame to be transmitted on the secondary link; associating a flag with the duplicate copy of the frame on the secondary link; and sending, from the device to the first and the second MLO access points, the frame and the duplicate copy on the primary link and the secondary link, respectively.

20 Claims, 6 Drawing Sheets

(56)     References Cited

U.S. PATENT DOCUMENTS

| | | | | |
|---|---|---|---|---|
| 2023/0125078 A1* | 4/2023 | Huang | H04W 76/30 | 370/328 |
| 2023/0247568 A1* | 8/2023 | Dong | H04W 52/58 | 370/311 |
| 2023/0319925 A1* | 10/2023 | Montemurro | H04W 76/15 | 370/329 |
| 2023/0370859 A1* | 11/2023 | Cao | H04W 16/26 | |
| 2024/0032089 A1* | 1/2024 | Chitrakar | H04W 48/02 | |
| 2024/0090057 A1* | 3/2024 | Yoshikawa | H04L 5/0048 | |
| 2024/0129271 A1* | 4/2024 | Chitrakar | H04L 61/103 | |
| 2024/0155713 A1* | 5/2024 | Naik | H04W 76/20 | |
| 2024/0205995 A1* | 6/2024 | Chu | H04W 76/15 | |
| 2025/0024541 A1* | 1/2025 | Ikeda | H04L 5/0053 | |

OTHER PUBLICATIONS

IEEE: "Draft Standard for Information Technology-Tele-Communications and Information Exchange Between Systems Local and Metropolitan Area Networks-Specific Requirements, Part 11: Wireless LAN Medium Access Control (MAC) and Physical Layer (PHY) Specifications, Amendment 8: Enhancements for Extremely High Throughput (EHT)", IEEE Draft P802.11BE_D0.2_REDLINE_COMPARED_TO_D0.1, IEEE-SA, Piscataway, NJ USA, vol. 802.11be Drafts, No. DO.2, Dec. 2, 2020, pp. 1-409, XP068192049, pp. 119-127.

International Search Report and Written Opinion for International Application No. PCT/US2024/027058, mailed Jul. 24, 2024, 14 Pages.

* cited by examiner

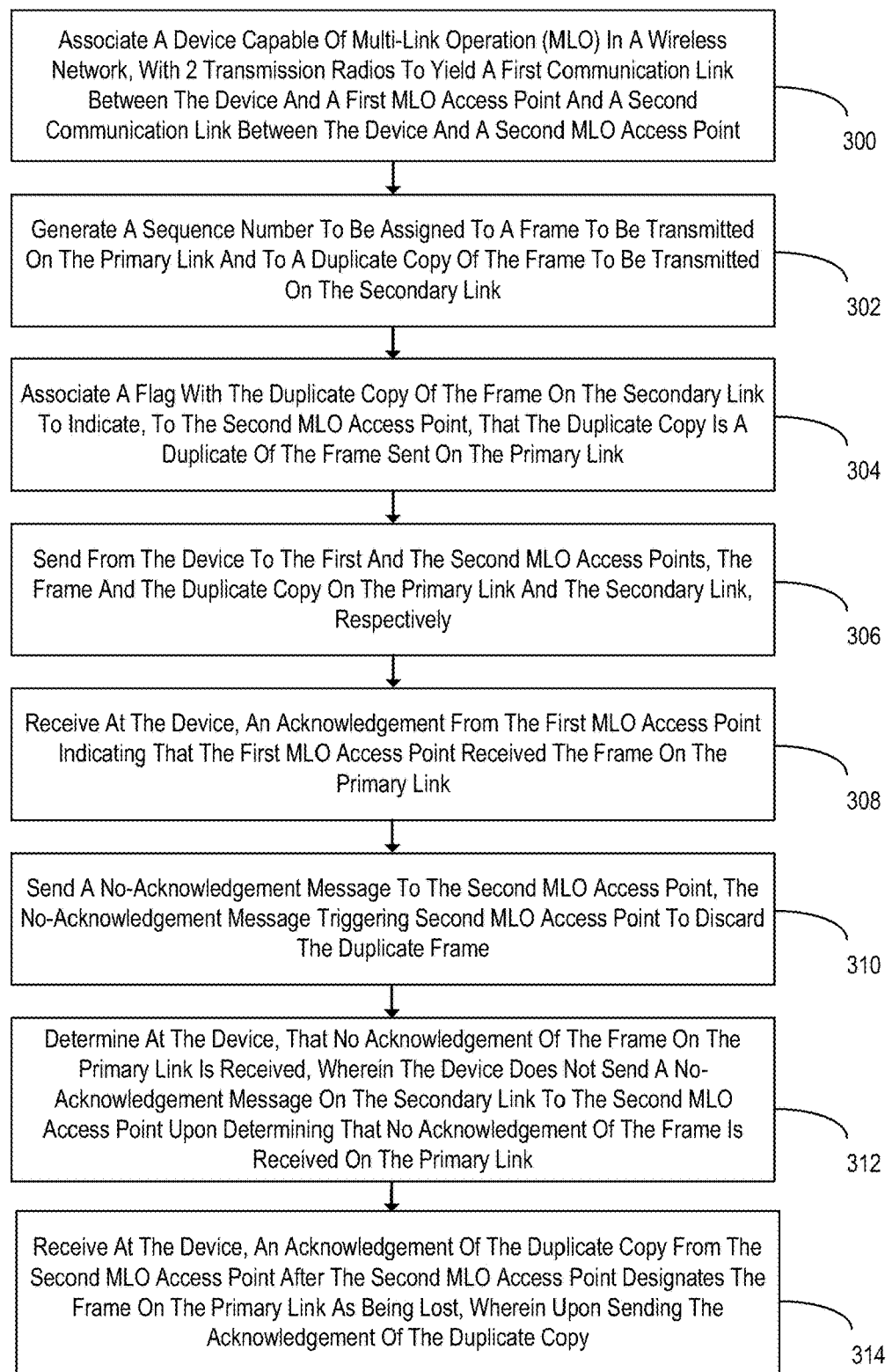

Associate A Device Capable Of Multi-Link Operation (MLO) In A Wireless Network, With 2 Transmission Radios To Yield A First Communication Link Between The Device And A First MLO Access Point And A Second Communication Link Between The Device And A Second MLO Access Point

300

Generate A Sequence Number To Be Assigned To A Frame To Be Transmitted On The Primary Link And To A Duplicate Copy Of The Frame To Be Transmitted On The Secondary Link

302

Associate A Flag With The Duplicate Copy Of The Frame On The Secondary Link To Indicate, To The Second MLO Access Point, That The Duplicate Copy Is A Duplicate Of The Frame Sent On The Primary Link

304

Send From The Device To The First And The Second MLO Access Points, The Frame And The Duplicate Copy On The Primary Link And The Secondary Link, Respectively

306

Receive At The Device, An Acknowledgement From The First MLO Access Point Indicating That The First MLO Access Point Received The Frame On The Primary Link

308

Send A No-Acknowledgement Message To The Second MLO Access Point, The No-Acknowledgement Message Triggering Second MLO Access Point To Discard The Duplicate Frame

310

Determine At The Device, That No Acknowledgement Of The Frame On The Primary Link Is Received, Wherein The Device Does Not Send A No-Acknowledgement Message On The Secondary Link To The Second MLO Access Point Upon Determining That No Acknowledgement Of The Frame Is Received On The Primary Link

312

Receive At The Device, An Acknowledgement Of The Duplicate Copy From The Second MLO Access Point After The Second MLO Access Point Designates The Frame On The Primary Link As Being Lost, Wherein Upon Sending The Acknowledgement Of The Duplicate Copy

DUPLICATE DETECTION METHOD FOR MULTI-LINK OPERATION TRANSMISSIONS

CROSS-REFERENCE TO RELATED APPLICATIONS

This application claims the benefit of Indian Provisional Application No. 202341033609 filed on May 12, 2023, the entire content of which is incorporated herein by reference.

BACKGROUND

In industrial environments, the main issue is reliability (i.e., making sure that each scheduled frame is transmitted and received properly). The station (STA) density is usually not high, and repeating frames is acceptable.

With the development of multi-link devices (MLD), an obvious and predictable consequence is the normalization of duplicate transmissions in these environments. Robots or other IoT objects embark an MLD, receive a packet in their buffer, and send the same over each of the links they have available. In complex settings, these robots will also embark a redundancy protocol allowing the robots to mark the packets as duplicates. On the other end of the line, a server will receive these duplicates and keep a single copy. This mode does not scale well, as a single choking point (i.e., the server) is in charge of de-duplication, while the risk (the reason to duplicate) is the unreliability of a single link (e.g., a Wi-Fi access link). Additionally, the duplication algorithm increases the complexity of the transmitter Operating System (OS) stack, while in many cases the stack can be fairly generic, and thus constrained.

Existing protocols such as Parallel Redundancy Protocol (PRP) can perform duplication and de-duplication. However, as stated above, these protocols require OS support on the client, and on the receiving side (e.g., a Double Attached Node for PRP (DANP)) acts as a bottleneck when the number of transmitters is large.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 3 illustrates an example of supporting packet duplication and de-duplication in MLO networks according to some aspects of the present disclosure.

DESCRIPTION OF EXAMPLE EMBODIMENTS

Figure 1:
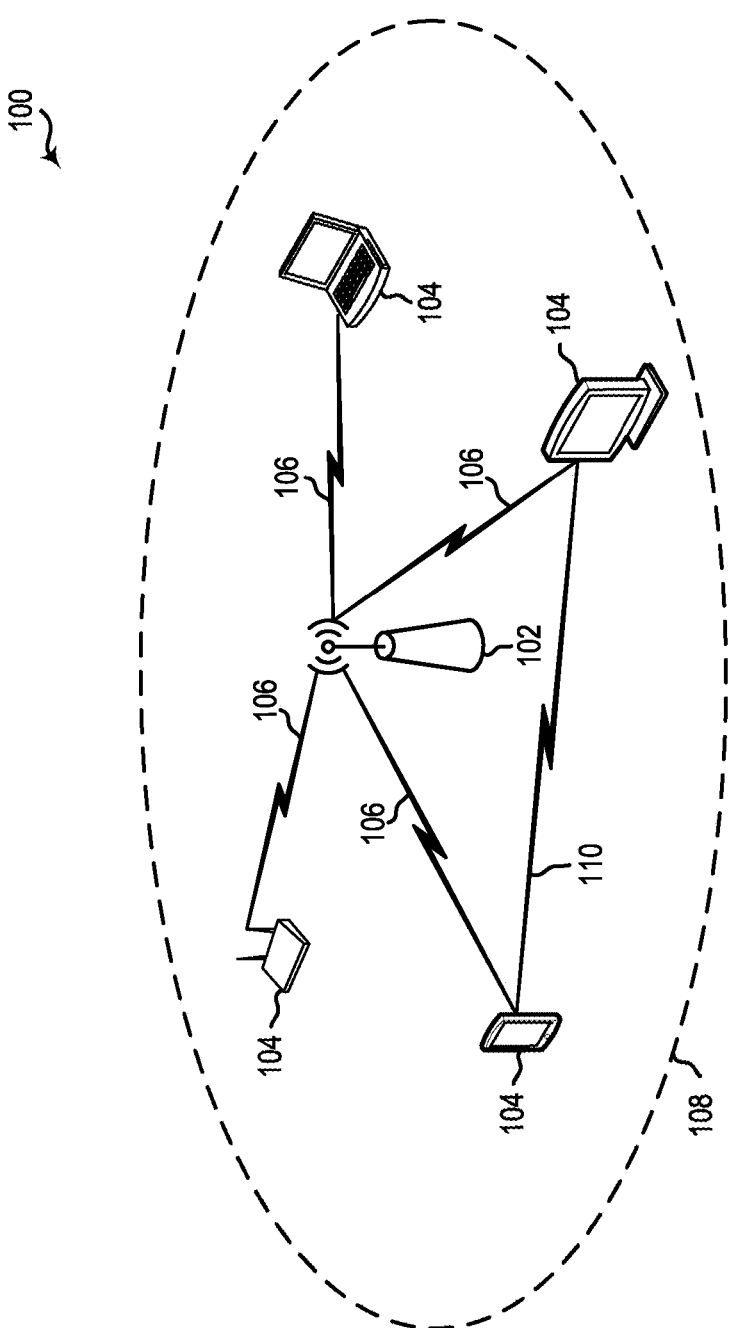
FIG. 1 shows a block diagram of an example wireless communication network according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Aspects of the present disclosure are directed to techniques for supporting packet duplication and de-duplication in the MLO wireless network, which can be deployed in various contexts (e.g., industrial environments). More specifically, the disclosed techniques rely upon generating the same sequence number for packets to be sent from a MLD to two or more communication links to one or more MLO access points operating on different channels. The sequence number is used to determine various processes for acknowledging a packet or a duplicate thereof at one or more of the MLO access points and/or for storing or forwarding the packets for further underlying processing.

In one aspect, a method includes associating a device capable of Multi-Link Operation (MLO) in a wireless network, with 2 transmission radios to yield a first communication link between the device and a first MLO access point and a second communication link between the device and a second MLO access point, wherein the device is configured to label the first communication link as a primary link and the second communication link as a secondary link; generating a sequence number to be assigned to a frame to be transmitted on the primary link and to a duplicate copy of the frame to be transmitted on the secondary link; associating a flag with the duplicate copy of the frame on the secondary link to indicate, to the second MLO access point, that the duplicate copy is a duplicate of the frame sent on the primary link; and sending, from the device to the first and the second MLO access points, the frame and the duplicate copy on the primary link and the secondary link, respectively.

In another aspect, the sequence number matches sequencing on the primary link and the secondary link.

In another aspect, upon observing the flag, the second MLO access point stores the duplicate copy in a buffer instead of acknowledging the duplicate copy back to the device.

In another aspect, the method further includes receiving, at the device, an acknowledgement from the first MLO access point indicating that the first MLO access point received the frame on the primary link; and sending, by the device and on the secondary link, a no-acknowledgement message to the second MLO access point, the no-acknowledgement message triggering second MLO access point to discard the duplicate frame.

In another aspect, the method further includes determining, at the device, that no acknowledgement of the frame on the primary link is received, wherein the device does not send a no-acknowledgement message on the secondary link to the second MLO access point upon determining that no acknowledgement of the frame is received on the primary link.

In another aspect, after expiration of a timer, the second MLO access point determines that the no-acknowledgement message is not received on the secondary link and designates the frame on the primary link as being lost.

In another aspect, the method further includes receiving, at the device, an acknowledgement of the duplicate copy from the second MLO access point after the second MLO access point designates the frame on the primary link as being lost, wherein upon sending the acknowledgement of the duplicate copy, the second MLO access point forwards the duplicate copy of the frame to a distribution system associated with the MLO in the wireless network.

In one aspect, a device includes one or more memories including computer-readable instructions stored therein, and one or more processors. The one or more processors configured to execute the computer-readable instructions to associate the device with 2 transmission radios to yield a first communication link between the device and a first MLO access point and a second communication link between the device and a second MLO access point, wherein the device is configured to label the first communication link as a primary link and the second communication link as a secondary link, and wherein the device is capable of Multi-Link Operation (MLO) in a wireless network; generate a sequence number to be assigned to a frame to be transmitted on the primary link and to a duplicate copy of the frame to be transmitted on the secondary link; associate a flag with the duplicate copy of the frame on the secondary link to indicate, to the second MLO access point, that the duplicate copy is a duplicate of the frame sent on the primary link; and send, from the device to the first and the second MLO access points, the frame and the duplicate copy on the primary link and the secondary link, respectively.

In another aspect, one or more non-transitory computer-readable media include computer-readable instructions, which when executed by one or more processors of a device capable of Multi-Link Operation (MLO) in a wireless network, cause the device to associate the device with 2 transmission radios to yield a first communication link between the device and a first MLO access point and a second communication link between the device and a second MLO access point, wherein the device is configured to label the first communication link as a primary link and the second communication link as a secondary link, and wherein the device is capable of Multi-Link Operation (MLO) in a wireless network; generate a sequence number to be assigned to a frame to be transmitted on the primary link and to a duplicate copy of the frame to be transmitted on the secondary link; associate a flag with the duplicate copy of the frame on the secondary link to indicate, to the second MLO access point, that the duplicate copy is a duplicate of the frame sent on the primary link; and send, from the device to the first and the second MLO access points, the frame and the duplicate copy on the primary link and the secondary link, respectively.

DETAILED DESCRIPTION

IEEE 802.11, commonly referred to as Wi-Fi, has been around for three decades and has become arguably one of the most popular wireless communication standards with billions of devices supporting more than half of the worldwide wireless traffic. The increasing user demands in terms of throughput, capacity, latency, spectrum and power efficiency calls for updates or amendments to the standard to keep up with them. As such, Wi-Fi generally has a new amendment after every five years with its own characteristic features. In the earlier generations, the focus was primarily higher data rates, but with ever increasing density of devices, area efficiency has become a major concern for Wi-Fi networks. Due to this issue, the last (802.11 be (Wi-Fi 7)) amendments focused more on the efficiency issue. The next expected update to IEEE 802.11 is coined as Wi-Fi 8. Wi-Fi 8 will attempt to further enhance throughput and minimize latency to meet the ever growing demand for the Internet of Things (IoT), high resolution video streaming, low-latency wireless services, etc.

Multiple Access Point (AP) coordination and transmission in Wi-Fi refers to the management of multiple access points in a wireless network to avoid interference and ensure efficient communication between the client devices and the network. When multiple access points are deployed in a network—for instance in buildings and office complexes- they operate on the same radio frequency, which can cause interference and degrade the network performance. To mitigate this issue, access points can be configured to coordinate their transmissions and avoid overlapping channels.

Wi-Fi 7 introduced the concept of multi-link operation (MLO), which gives the devices (Access Points (APs) and Stations (STAs)) the capability to operate on multiple links (or even bands) at the same time. MLO introduces a new paradigm to multi-AP coordination which was not part of the earlier coordination approaches. MLO is considered in Wi-Fi-7 to improve the throughput of the network and address the latency issues by allowing devices to use multiple links.

A multi-link device (MLD) may have several "affiliated" devices, each affiliated device having a separate PHY interface, and the MLD having a single link to the Logical Link Control (LLC) layer. In the proposed IEEE 802.11 be draft, a multi-link device (MLD) is defined as: "A device that is a logical entity and has more than one affiliated station (STA) and has a single medium access control (MAC) service access point (SAP) to logical link control (LLC), which includes one MAC data service" (see: LAN/MAN Standards Committee of the IEEE Computer Society, Amendment 8: Enhancements for extremely high throughput (EHT), IEEE P802.11 be™/D0.1, September 2020, section 3.2). Connection(s) with an MLD on the affiliated devices may occur independently or jointly. A preliminary definition and scope of a multi-link element is described in section 9.4.2.247b of aforementioned IEEE 802.11 be draft. An idea behind this information element/container is to provide a way for multi-link devices (MLDs) to share the capabilities of different links with each other and facilitate the discovery and association processes. However, this information element may still be changed or new mechanisms may be introduced to share the MLO information (e.g. related to backhaul usage).

In multi-link operation (MLO) both STA and APs can possess multiple links that can be simultaneously active. These links may or may not use the same bands/channels.

MLO allows sending PHY protocol data units (PPDUs) on more than one link between a STA and an AP. The links may be carried on different channels, which may be in different frequency bands. Based on the frequency band and/or channel separation and filter performance, there may be restrictions on the way the PPDUs are sent on each of the links.

MLO may include a basic transmission mode, an asynchronous transmission mode, and a synchronous transmission mode.

In a basic transmission mode, there may be multiple primary links, but a device may transmit PPDU on one link at a time. The link for transmission may be selected as follows. The device (such as an AP or a STA) may count down a random back off (RBO) on both links and select a link that wins the medium for transmission. The other link may be blocked by in-device interference. In basic transmission mode, aggregation gains may not be achieved.

In an asynchronous transmission mode, a device may count down the RBO on both links and perform PPDU transmission independently on each link. The asynchronous transmission mode may be used when the device can support simultaneous transmission and reception with bands that have sufficient frequency separation such as separation between the 2.4 GHz band and the 5 GHz band. The asynchronous transmission mode may provide both latency and aggregation gains.

In a synchronous PPDU transmission mode, the device may count down the RBO on both links. If a first link wins the medium, both links may transmit PPDUs at the same time. The transmission at the same time may minimize in-device interference and may provide both latency and aggregation gains.

Multi-AP coordination and MLO are two features proposed to improve the performance of Wi-Fi networks in the upcoming IEEE 802.11 be amendment. Multi-AP coordination is directed toward utilizing (distributed) coordination between different APs to reduce inter-Basic Service Set (BSS) interference for improved spectrum utilization in dense deployments. MLO, on the other hand, supports high data rates and low latency by leveraging flexible resource utilization offered by the use of multiple links for the same device.

As noted above, with the development of multi-link devices (MLD), an obvious and predictable consequence is the normalization of duplicate transmissions in these environments, which can occur frequently in various contexts such as industrial environments. Existing methods are inadequate, introduce bottlenecks and complexities.

Aspects of the present disclosure are directed to remedying the deficiencies of existing duplication and de-duplication processes through use of sequence numbers when packets are sent on multiple links in a MLO-based wireless network. The use of sequence numbers and other novel aspects of the techniques introduced in this disclosure will be described more fully below in the non-limiting context of MLO networks.

FIG. 1 shows a block diagram of an example wireless communication network according to some aspects of the present disclosure. Wireless communication network 100 can be an example of a wireless local area network (WLAN) such as a Wi-Fi network (and will hereinafter be referred to as WLAN 100). For example, WLAN 100 can be a Wi-Fi network operating based on any currently available or to be developed IEEE 802.11 protocols and standards (e.g., 802.11 ay, 802.11 ax, 802.11az, 802.11ba and 802.11be, etc.). WLAN 100 may include wireless communication devices such as an AP 102 and multiple STAs 104. The number of APs and STAs are not limited to that shown in FIG. 1 and can be more or less. Any one or more of AP 102 and STAs 104 may be capable of MLO (multi-link reception and/or transmission).

Each of STAs 104 can be any one or more of mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), IoT devices, etc.

A single AP 102 and an associated set of STAs 104 may be referred to as a basic service set (BSS), managed by AP 102.

FIG. 1 shows an example coverage area 108 of AP 102, which may represent a basic service area (BSA) of WLAN 100. BSS may be identified to users by a service set identifier (SSID), as well as to other devices by a basic service set identifier (BSSID), which may be a medium access control (MAC) address of AP 102. AP 102 can periodically broadcast beacons including BSSID to enable any STA 104 within wireless range of AP 102 to "associate" or re-associate with AP 102 to establish a communication link 106 with AP 102. For example, the beacons can include an identification of a primary channel used by respective AP 102 as well as a timing synchronization function for establishing or maintaining timing synchronization with AP 102.

To establish a communication link 106 with an AP 102, each of STAs 104 is configured to perform passive or active scans on frequency channels in one or more frequency bands (for example, the 2.4 GHz, 5 GHZ, 6 GHz or 60 GHz bands). Passive scans entail a STA 104 listening for beacons transmitted by AP 102 at a periodic time interval referred to as the target beacon transmission time (TBTT) (measured in time units (TUs) where one TU may be equal to 1024 microseconds (μs)). Active scans entail a STA 104 generating and sequentially transmitting probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with a selected AP 102. AP 102 assigns an association identifier to STA 104 at the conclusion of the association operations, which AP 102 can then utilize to track STA 104.

As a result of the increasing ubiquity of wireless networks, a STA 104 may have the opportunity to select one of many APs 102 within range of the STA or to select among multiple APs 102 that together form an extended service set (ESS) including multiple connected APs 102. An extended network station associated with WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a roaming scan to find another AP 102 having more desirable network characteristics such as a greater received signal strength indicator (RSSI), a reduced traffic load, etc.

In some cases, STAs 104 may form ad-hoc networks without APs 102. In some examples, ad hoc networks may be implemented within a larger wireless network such as WLAN 100. In such implementations, while the STAs 104 may be capable of communicating with each other through the AP 102 using communication links 110, STAs 104 also can communicate directly with each other via direct wireless links 110. Additionally, two STAs 104 may communicate via a direct communication link 110 regardless of whether both STAs 104 are associated with and served by same AP 102. In such an ad hoc system, one or more of STAs 104 may assume the role filled by AP 102 in a BSS. Such a STA 104 may coordinate transmissions within the ad hoc network. Examples of direct wireless links 110 include Wi-Fi Direct connections, connections established by using a Wi-Fi Tunneled Direct Link Setup (TDLS) link, and/or any other known or to be developed direct wireless communication scheme.

APs 102 and STAs 104 may function and communicate (via the respective communication links 106 and 110) according to the IEEE 802.11 family of wireless communication protocol standards. AP 102 and STAs 104 in WLAN 100 may transmit PPDUs over an unlicensed spectrum that can include frequency bands used by Wi-Fi technology, such as the 2.4 GHz band, the 5 GHz band, the 60 GHz band, the 3.6 GHZ band, and the 900 MHz band. Some implementations of AP 102 and STAs 104 described herein also may communicate in other frequency bands, such as the 6 GHz band, which may support both licensed and unlicensed communications. AP 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHZ, or 6 GHz bands, each of which can be divided into multiple 20 MHz channels. PPDUs can be transmitted over a physical channel having a minimum bandwidth of 20 MHz or larger channels having bandwidths of 40 MHz, 80 MHz, 160 or 320 MHz, etc., which can be formed by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
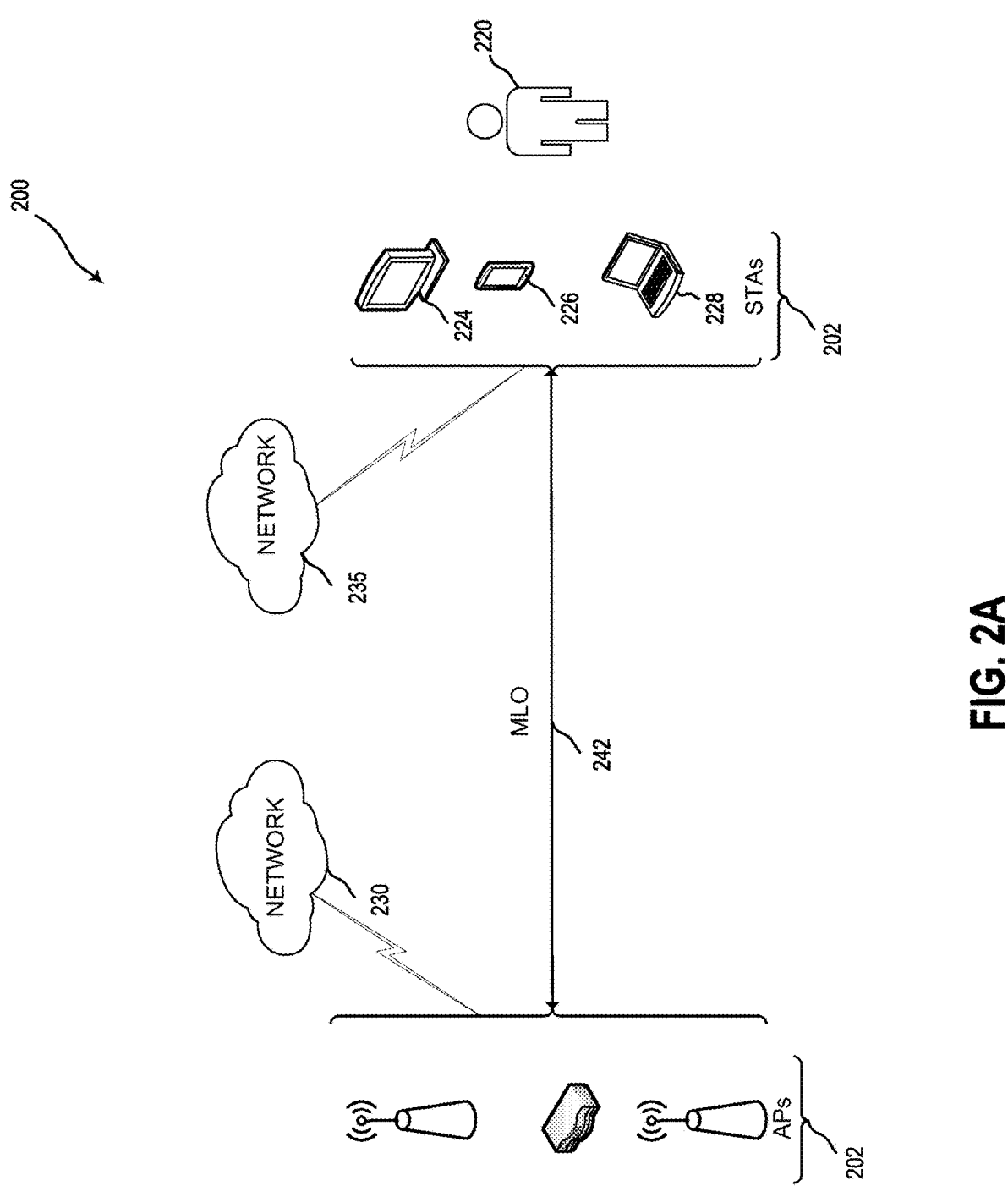
FIG. 2A is a network diagram illustrating an example network environment of multi-link operation according to some aspects of the present disclosure.

FIG. 2A is a network diagram illustrating an example network environment of multi-link operation according to some aspects of the present disclosure. Wireless network 200 may include one or more STAs 220 (includes example devices 224, 226, and 228) and one or more APs 202, which may communicate in accordance with IEEE 802.11 communication standards. STAs 220 and APs 202 may be the same as STAs 104 and AP 102 of FIG. 1, respectively.

One or more STAs 220 and/or APs 202 may be operable by one or more user(s) 210.

STAs 220 and/or APs 202 may also include mesh stations in, for example, a mesh network, in accordance with one or more IEEE 802.11 standards and/or 3GPP standards.

Any of STAs 220 and AP(s) 202 may be configured to communicate with each other via one or more communications networks 230 and/or 235, which may be the same as WLAN 100. STAs 220 may also communicate peer-to-peer or directly with each other with or without AP(s) 202. Any of the communications networks 230 and/or 235 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 230 and/or 235 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 230 and/or 235 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of STAs 220 and AP(s) 202 may be configured to perform directional transmission and/or directional reception in conjunction with wirelessly communicating in a wireless network. Any of STAs 220 and AP(s) 202 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of STAs 220 and AP(s) 202 may be configured to perform any given directional transmission towards one or more defined transmit sectors. Any of STAs 220 and AP(s) 202 may be configured to perform any given directional reception from one or more defined receive sectors.

Multiple Input-Multiple Output (MIMO) beamforming in a wireless network may be accomplished using RF beamforming and/or digital beamforming. In some embodiments, in performing a given MIMO transmission, STAs 220 and/or AP(s) 202 may be configured to use all or a subset of its one or more communications antennas to perform MIMO beamforming.

Any of STAs 220 and AP(s) 202 may include any suitable radio and/or transceiver for transmitting and/or receiving radio frequency (RF) signals in the bandwidth and/or channels corresponding to the communications protocols utilized by any of STAs 220 and AP(s) 202 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b. 802.11g. 802.11n. 802.11ax). 5 GHZ channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af. IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one example, and with reference to FIG. 1A. APs 102 may facilitate multi-link operation 242 with one or more STAs 220.

In one example, multi-link operation 242 may have a single-radio non-access point (AP) MLD listen to two or more channels simultaneously by (1) configuring a 2×2 Tx/Rx (or M×M Tx/Rx) to allocate a 1×1 resource on each channel/band (e.g., 5 GHz and 6 GHz). (2) add extra Rx modules, or (3) add wake-up receivers. An AP MLD then transmits on any idle channel a control frame (e.g., request to send (RTS) or multi-user (MU) RTS) before either a single data frame or a group of data frames within a single transmit opportunity (TXOP) to indicate that frames will be transmitted on that channel. The non-AP MLD responds back with a control frame (e.g., clear to send (CTS)). The single-radio non-AP MLD configures its radio back to 2×2 Tx/Rx module on the channel it received the control frame from the AP MLD and receives data. When using a wake-up receiver (802.11ba), the AP MLD transmits a wake-up packet. This also could be extended to other architectures with different antenna configurations. As example, a device with 3×3, when in that case a 2×2 resource on one channel and a 1×1 on another channel.

In one example, a multi-link operation 242 may enable a single-radio non-AP MLD to achieve throughput enhancement and latency reduction in a busy network without needing to implement a concurrent dual-radio, thus significantly reducing device cost.

Figure 2B:
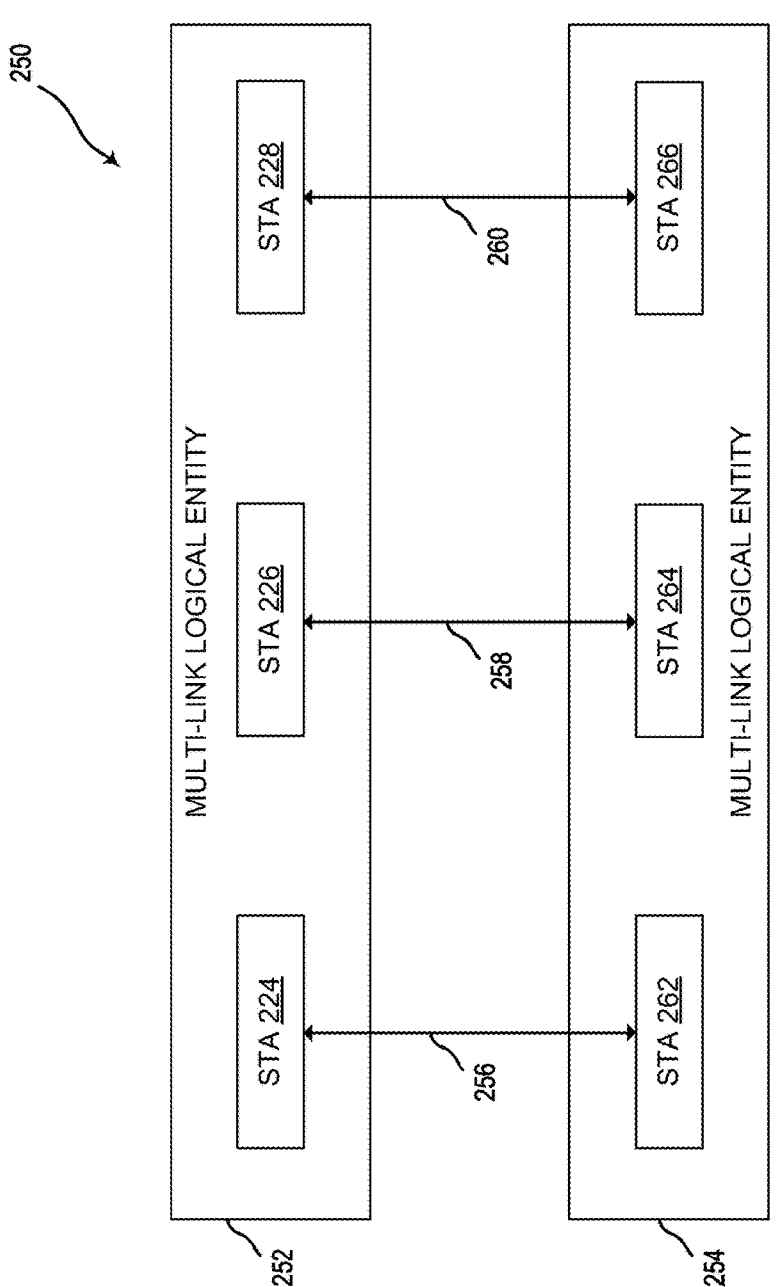
FIG. 2B depicts an illustrative schematic diagram for MLD between two logical entities according to some aspects of the present disclosure.

FIG. 2B depicts an illustrative schematic diagram for MLD between two logical entities according to some aspects of the present disclosure.

Referring to FIG. 2B, schematic diagram 250 shows two multi-link logical entities 252 and 254 that can set up communication links 256, 258, and 260 with each other. A multi-link logical entity may be a logical entity that contains one or more STAs such as STAs 220. The logical entity has one MAC data service interface and primitives to the logical link control (LLC) and a single address associated with the interface, which can be used to communicate on the distribution system medium (DSM). It should be noted that a Multi-link logical entity allows STAs within the multi-link logical entity to have the same MAC address. It should also be noted that the exact name can be changed.

In this example of FIG. 2B, multi-link logical entity 252 and multi-link logical entity 254 may be two separate physical devices, where each one comprises a number of virtual or logical devices. For example, multi-link logical entity 252 may comprise three STAs such as STAs 224, 226, and 228. Multi-link logical entity 254 may include another three STAs (e.g., STAs 262, 264, and 266). In one example, STA 224 may communicate with STA 262 over link 256, STA 226 may communicate with STA 264 over link 258, and STA 228 may communicate with STA 266 over link 260.

Figure 2C:
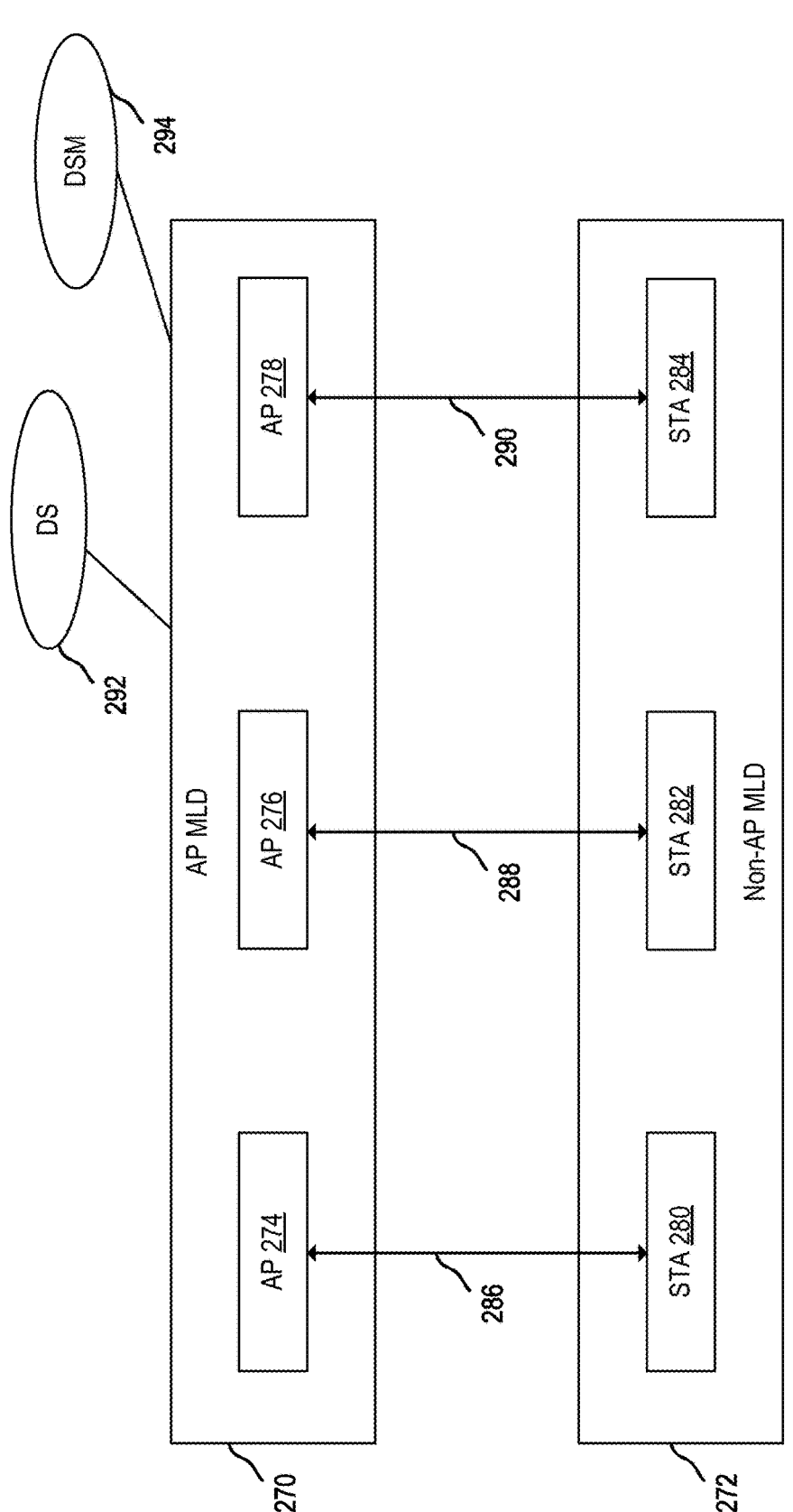
FIG. 2C depicts an illustrative schematic diagram for MLD between AP with logical entities and a non-AP with logical entities according to some aspects of the present disclosure.

FIG. 2C depicts an illustrative schematic diagram for MLD between AP with logical entities and a non-AP with logical entities according to some aspects of the present disclosure.

Referring to FIG. 2C, two multi-link logical entities 270 and 272 are shown. AP logical entity 270 may include physical and/or logical APs 274, 276, and 278 operating in different frequency bands (e.g., 2.4 GHz, 5 GHZ, and 6 GHz). APs 274, 276, and 278 can be the same as AP 102 and/or any one of APs 202 described above. Non-AP logical entity 272 may include STAs 280, 282, and 284, which may be the same as or similar to STAs 224, 226, 228, 262, 264, and/or 266.

AP 274 may communicate with STA 280 via link 286. AP 276 may communicate with STA 282 via link 288. AP 278 may communicate with STA 284 via link 290.

Multi-link AP logical entity 270 is shown in FIG. 2C to have access to a distribution system (DS) 292, which is a system used to interconnect a set of BSSs to create an extended service set (ESS). The multi-link AP logical entity 270 is also shown in FIG. 2C to have access a distribution system medium (DSM) 294, which is the medium used by a DS for BSS interconnections. Simply put. DS and DSM allow the AP to communicate with different BSSs.

It should be understood that although the example shows three logical entities within the multi-link AP logical entity and the three logical entities within the multi-link non-AP logical entity, this is merely for illustration purposes and that other numbers of logical entities with each of the multi-link AP and non-AP logical entities may be envisioned.

The example WiFi systems and MLO described above with reference to FIGS. 1 and 2A-C may be implemented within a broader enterprise network architecture, a cellular network (private and/or public), etc.

FIG. 3 illustrates an example of supporting packet duplication and de-duplication in MLO networks according to some aspects of the present disclosure. Various steps of FIG. 3 will be described with reference to FIGS. 1 and 2A-C. In one example, steps of example process of FIG. 3 will be described from the perspective of an STA (e.g., any one of non-AP MLDs 272 such as STA 280, STA 282, and STA 284). For ease of description, STA 280 will be referenced in describing FIG. 3. Furthermore, in describing the steps of FIG. 3, references may be made to a first and second MLO access point, each of which may be one of AP MLDs 270 such as AP 274, AP 276, and/or AP 278. References are also made to a first communication link and a second communication. While not shown in FIGS. 2A-C, such communication links may be from any one of STAs 280, 282, or 284 to either (1) one of APs 274, 276, and 278 over two different frequency channels (e.g., 5 GHZ and 6 GHz channels), or (2) to two of APs 274, 276, and 278 over different frequency channels. A frequency channel may also be referred to as transmission radio, radio interface, or simply a radio.

The non-limiting example process of FIG. 3 proposes a distributed mode relying on L2 mechanisms, thus making it easier to integrate into Wi-Fi 8 (as MLD is also an 802.11 protocol, duplication management would happen in the same protocol, and more importantly at the same location). The proposed technique is an augmentation of MLO to support duplicate management operations.

At step 300, STA 280 (device) may associate STA 280 with 2 transmission radios to yield a first communication link between the STA 280 and a first MLO access point (e.g., AP 274) and a second communication link between the STA 280 and a second MLO access point (e.g., AP 276).

As noted, STA 280 is capable of Multi-Link Operation (MLO) in a wireless network. In one example and in augmentation to 802.11be 35.3.5.1, one of the first and second links may be indicated as primary. In other words, STA 280 may be configured to label the first communication link as a primary link and the second communication link as a secondary link. STA 280 may change its MLD without need to re-associate with an MLO access point. In one example, STA 280 can dynamically move either of the first and second communication links without the need to reassociate, but also to declare any link as the new primary link or the secondary link.

At step 302, STA 280 may generate a sequence number to be assigned to a frame to be transmitted on the primary link as well as to a duplicate copy of the frame to be transmitted on the secondary link. In one example, the same sequence number may be assigned to the frame and the duplicate copy of the frame on the primary and the secondary links.

The sequence number generated may match the sequencing on both primary and secondary links, which may cause STA 280 to jump to a higher number for a link (e.g., the primary link) sequence not to collide with the numbering on the other link (e.g., the secondary link).

At step 304, STA 280 may associate (assign) a flag with the duplicate copy of the frame on the secondary link to indicate, to the second MLO access point, that the duplicate copy is a duplicate of the frame sent on the primary link. This flag can cause the ACK policy on the secondary link to enter a new mode, that augments the Ack policy mode in 802.11ax 9.2.4.5.4. This augmented Ack mode may be referred to as a delegated Ack mode. In this mode, STA 280 does not expect the second MLO access point (associated with the secondary link) to acknowledge the frame, or to immediately forward it to the DS. Rather, the AP holds the frame in a buffer of second MLO access point.

With the sequence number generated for the frame and the duplicate copy as well as the flag for the duplicate copy, at step 306, STA 280 may send the frame to the first MLO access point on the primary link and the duplicate copy of the frame to the second MLO access point on the secondary link.

In one example, upon observing the flag, the second MLO access point stores the duplicate copy in a buffer instead of acknowledging the duplicate copy back to the device.

At step 308, STA 280 may receive an acknowledgement from the first MLO access point indicating that the first MLO access point received the frame on the primary link. More specifically, when the first MLO access point on the primary link properly receives the frame, the first MLO access point sends an acknowledgement message (e.g., an ACK) back to STA 280 after a period of time (which may be equal to Short Interframe Space (SIFS)).

Thereafter and in response to receiving the acknowledgement from first MLO access point, STA 280, at step 310, may send a no-acknowledgement message to the second MLO access point, the no-acknowledgement message triggering second MLO access point to discard the duplicate frame. In one example, STA 280 may send the no-acknowledgement message after an SIFS on the secondary link for the duplicate copy of the frame identified by the sequence number generated at step 302. In one example, discarding the duplicate frame may include flushing the duplicate copy of the frame and not forwarding it to the DS.

In some instances, the first MLO access point on the primary link may fail to receive the frame sent at step 306 properly and hence does not acknowledge the reception of it back to STA 280. At step 312, after the expiration of a waiting timer (which in one non-limiting example may be equal to two SIFS+ACK+noACK period), STA 280 determines no acknowledgement of the frame on the primary link is received and hence, does not send a no-acknowledgement message discussed at step 310. Upon second MLO access point on the secondary link observing that STA 280 has not sent a no-acknowledgement message (frame), second MLO access point may conclude that the frame on the primary link was lost. Based on this conclusion, second MLO access point may send an acknowledgement for the duplicate copy of the frame back to STA 280 on the secondary link to STA 280 (which may be received by STA 280 at step 314) and forwards the duplicate copy of the frame to the DS.

The waiting period described above is not limited to two SIFS+ACK+noACK but may be longer or shorter and hence may be a configurable parameter determined based on experiments and/or empirical studies.

In one or more examples and to address the ordering requirement for transmissions, first and second MLO access points may perform the following.

In IEEE 802.11be, the reassembly is indeed in the MLD, so when the connection is split between two MLO access points, there needs to be a mechanism to ensure reordering between the two MLO access points. One proposed solution is to perform the reassembly provisions (and counter/scoreboard/win size R in IEEE 802.11be 35.3.8 (and naturally baseline IEEE 802.11be 10.25.6.6.1/6.63 and associated protocols) in first MLO access point. This process supposes that the role of second MLO access point is then to forward the received duplicate copy of the frame to first MLO access point.

In another example, the operation may be performed naturally at block level (thus second MLO access point can ignore any fragment), thus following 802.11be 5-2b and still allowing second MLO access point to signal to first MLO access point that it forwarded a complete segment upstream to DS.

Figure 4:
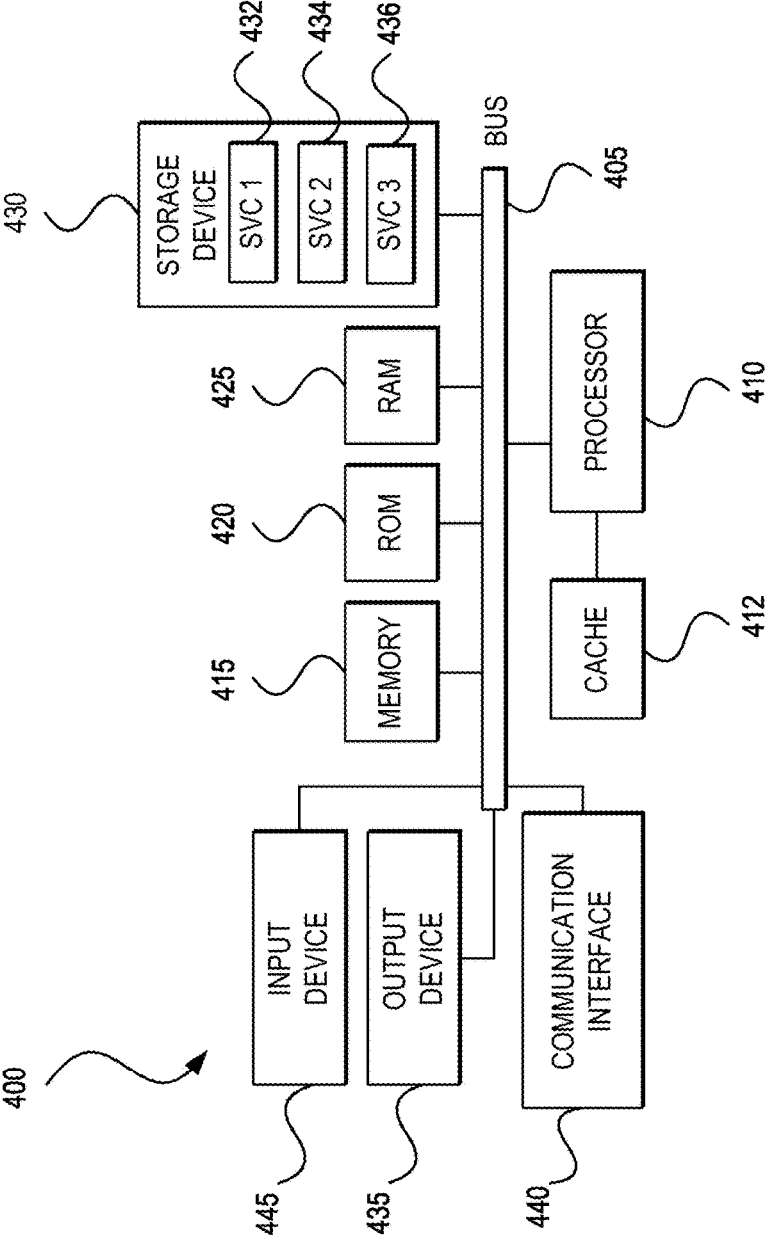
FIG. 4 shows an example of a system for implementing certain aspects of the present technology.

FIG. 4 shows an example of computing system 400, which can be for example any computing device making up components of systems described above with reference to FIGS. 1-3. Components of computing system 400 may be in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, read-only memory (ROM) 420, and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:

associating a device capable of Multi-Link Operation (MLO) in a wireless network, with two transmission radios to yield a first communication link between the device and a first MLO access point and a second communication link between the device and a second MLO access point, wherein the device is configured to label the first communication link as a primary link and the second communication link as a secondary link;

generating a sequence number to be assigned to a frame to be transmitted on the primary link and to a duplicate copy of the frame to be transmitted on the secondary link;

associating a flag with the duplicate copy of the frame on the secondary link to indicate, to the second MLO access point, that the duplicate copy is a duplicate of the frame sent on the primary link;

sending, from the device to the first MLO access point and the second MLO access point, the frame and the duplicate copy on the primary link and the secondary link, respectively;

determining, at the device, that no acknowledgement of the frame on the primary link is received, wherein after expiration of a timer, the second MLO access point designates the frame on the primary link as being lost; and receiving, at the device, an acknowledgement of the duplicate copy from the second MLO access point after the second MLO access point designates the frame on the primary link as being lost.

2. The method of claim 1, wherein the sequence number matches sequencing on the primary link and the secondary link.

3. The method of claim 1, wherein upon observing the flag, the second MLO access point stores the duplicate copy in a buffer instead of acknowledging the duplicate copy back to the device.

4. The method of claim 1, further comprising:

receiving, at the device, an acknowledgement from the first MLO access point indicating that the first MLO access point received the frame on the primary link; and sending, by the device and on the secondary link, a no-acknowledgement message to the second MLO access point, the no-acknowledgement message triggering the second MLO access point to discard the duplicate copy.

5. The method of claim 1, wherein the device does not send a no-acknowledgement message on the secondary link to the second MLO access point upon determining that no acknowledgement of the frame is received on the primary link.

6. The method of claim 5, wherein after the expiration of the timer, the second MLO access point determines that the no-acknowledgement message is not received on the secondary link before designating the frame on the primary link as being lost.

7. The method of claim 6, wherein upon sending the acknowledgement of the duplicate copy, the second MLO access point forwards the duplicate copy of the frame to a distribution system associated with the MLO in the wireless network.

8. A device comprising:

one or more memories including computer-readable instructions stored therein; and one or more processors configured to execute the computer-readable instructions to:

associate the device with two transmission radios to yield a first communication link between the device and a first MLO access point and a second communication link between the device and a second MLO access point, wherein the device is configured to label the first communication link as a primary link and the second communication link as a secondary link, and wherein the device is capable of Multi-Link Operation (MLO) in a wireless network;

generate a sequence number to be assigned to a frame to be transmitted on the primary link and to a duplicate copy of the frame to be transmitted on the secondary link;

associate a flag with the duplicate copy of the frame on the secondary link to indicate, to the second MLO access point, that the duplicate copy is a duplicate of the frame sent on the primary link;

send, from the device to the first MLO access point and the second MLO access point, the frame and the duplicate copy on the primary link and the secondary link, respectively;

determine that no acknowledgement of the frame on the primary link is received, wherein after expiration of a timer, the second MLO access point designates the frame on the primary link as being lost; and receive an acknowledgement of the duplicate copy from the second MLO access point after the second MLO access point designates the frame on the primary link as being lost.

9. The device of claim 8, wherein the sequence number matches sequencing on the primary link and the secondary link.

10. The device of claim 8, wherein upon observing the flag, the second MLO access point is configured the duplicate copy in a buffer instead of acknowledging the duplicate copy back to the device.

11. The device of claim 8, wherein the one or more processors are further configured to execute the computer-readable instructions to:

receive an acknowledgement from the first MLO access point indicating that the first MLO access point received the frame on the primary link; and send, on the secondary link, a no-acknowledgement message to the second MLO access point, the no-acknowledgement message triggering the second MLO access point to discard the duplicate copy.

12. The device of claim 8, wherein the device does not send a no-acknowledgement message on the secondary link to the second MLO access point upon determining that no acknowledgement of the frame is received on the primary link.

13. The device of claim 12, wherein after the expiration of the timer, the second MLO access point determines that the no-acknowledgement message is not received on the secondary link before designating the frame on the primary link as being lost.

14. The device of claim 13, wherein upon sending the acknowledgement of the duplicate copy, the second MLO access point forwards the duplicate copy of the frame to a distribution system associated with the MLO in the wireless network.

15. One or more non-transitory computer-readable media comprising computer-readable instructions, which when executed by one or more processors of a device capable of Multi-Link Operation (MLO) in a wireless network, cause the device to:

associate the device with two transmission radios to yield a first communication link between the device and a first MLO access point and a second communication link between the device and a second MLO access point, wherein the device is configured to label the first communication link as a primary link and the second communication link as a secondary link, and wherein the device is capable of Multi-Link Operation (MLO) in a wireless network;

generate a sequence number to be assigned to a frame to be transmitted on the primary link and to a duplicate copy of the frame to be transmitted on the secondary link;

associate a flag with the duplicate copy of the frame on the secondary link to indicate, to the second MLO access point, that the duplicate copy is a duplicate of the frame sent on the primary link;

send, from the device to the first MLO access point and the second MLO access point, the frame and the duplicate copy on the primary link and the secondary link, respectively;

determine that no acknowledgement of the frame on the primary link is received, wherein after expiration of a timer, the second MLO access point designates the frame on the primary link as being lost; and receive an acknowledgement of the duplicate copy from the second MLO access point after the second MLO access point designates the frame on the primary link as being lost.

16. The one or more non-transitory computer-readable media of claim 15, wherein the sequence number matches sequencing on the primary link and the secondary link.

17. The one or more non-transitory computer-readable media of claim 15, wherein upon observing the flag, the second MLO access point is configured the duplicate copy in a buffer instead of acknowledging the duplicate copy back to the device.

18. The one or more non-transitory computer-readable media of claim 15, wherein-execution of the computer-readable instructions further cause the device to:

receive an acknowledgement from the first MLO access point indicating that the first MLO access point received the frame on the primary link; and send, on the secondary link, a no-acknowledgement message to the second MLO access point, the no-acknowledgement message triggering the second MLO access point to discard the duplicate copy.

19. The one or more non-transitory computer-readable media of claim 15, wherein the device does not send a no-acknowledgement message on the secondary link to the second MLO access point upon determining that no acknowledgement of the frame is received on the primary link, and after the expiration of the timer, the second MLO access point determines that the no-acknowledgement message is not received on the secondary link before designating the frame on the primary link as being lost.

20. The one or more non-transitory computer-readable media of claim 19, wherein upon sending the acknowledgement of the duplicate copy, the second MLO access point forwards the duplicate copy of the frame to a distribution system associated with the MLO in the wireless network.

* * * * *